July 14, 1936.  J. H. WEIS  2,047,345
TREATMENT OF SYENITES
Filed May 1, 1934
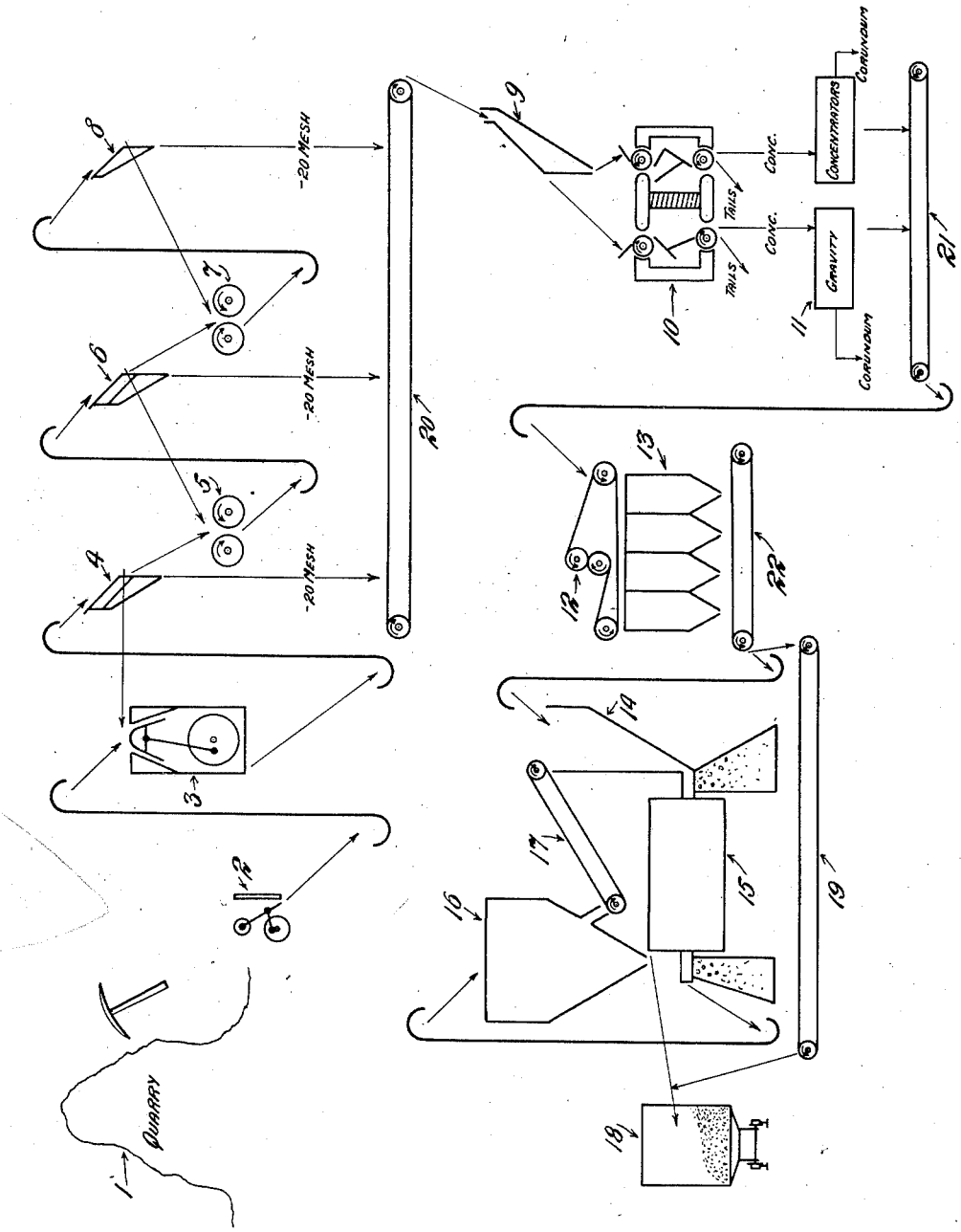
INVENTOR
JOSEPH H. WEIS
BY
ATTORNEY

106. COMPOSITIONS, COATING OR PLASTIC.

Patented July 14, 1936

2,047,345

UNITED STATES PATENT OFFICE 2,047,345

TREATMENT OF SYENITES

Joseph H. Weis, Scranton, Pa., assignor to Feldspathic Research Corporation, New York, N. Y., a corporation of Delaware Application May 1, 1934, Serial No. 723,343

4 Claims. (Cl. 252—1)

This invention relates to the refining treatment of syenites, particularly to the separation of syenites from various iron bearing mineral impurities with which they are commonly associated, in order to utilize deposits of this mineral for purposes other than those in which they have heretofore been employed.

Syenites are generally classified as (a) common, (b) corundum, (c) nephelite, (d) porphyry. My refining method is adaptable in general to all varieties; modification being necessary when non-iron bearing minerals are to be separated as in the case of corundum.

According to Pirsson & Knopf (Rocks and Rock Minerals, published by John Wiley & Sons, 1926), syenite has the same value as granite for all constructional uses. In Arkansas, syenite is used as a building stone and, since it contains no quartz, it can be polished easily; furthermore, it resists heat during fires, thus making it more desirable than granite in these respects.

Because the only known use for syenite is as building stone, this product must compete with granite and other similar rocks. When used for this purpose it commands a low price and, since sources of building stone are relatively abundant, most deposits of syenite have little value and are generally not exploited unless they possess some particular economic advantage over other deposits of building stone.

I have discovered new uses for these syenites. Through the use of my process, hereinafter described, it is possible to use these syenites in ceramics and polishing preparations, and when used for these purposes, syenites command a higher value. Furthermore, the market for syenites is greatly broadened to include other industries such as pottery, porcelain enamel and glass.

Although the mineral feldspar is used successfully in ceramics, syenites, after treatment with my process, are better suited than feldspar for this purpose, for several reasons. Feldspar contains an average of 15% free quartz which acts as a diluent, lowers the grade, and by its presence increases the total cost of the product. Syenites contain no free quartz and after treatment with my process are in a pure concentrated form. Furthermore, the refined product is much more fusible and has a distinctly lower melting range than feldspar. This valuable property of refined syenite results in a saving of heat which is one of the principal items of expense in ceramic plants.

When used in glass, my product is decidedly superior to feldspar because its alumina content is considerably higher. The alumina content of feldspar averages 17½% whereas the product resulting from my treatment has an alumina content generally more than 23%. Since the alumina content determines the value of feldspar for glass manufacture, it is quite apparent that my syenite product is approximately 30% more concentrated, or in other words 30% more efficient.

My process of refining syenites consists, in general, in correct granulation, sizing, high intensity magnetic separation, gravity concentration for removal of corundum, when present, and chemical control for regulation of uniformity of the finished product. The preferred process will be described in connection with the accompanying drawing which is a diagrammatic flow sheet showing an arrangement of equipment by which the process herein described and claimed may be carried out in practice.

In the drawing, 1 represents the deposit of syenite which may be quarried or mined by conventional methods. The most desirable type of syenite is the white variety, because the iron content of this type of syenite is usually considerably lower than the darker colored varieties, resulting in higher grade concentrates. The run-of-mine syenite, without the usual hand selection and attendant high waste required in feldspar mining, is then crushed in jaw crusher 2, and a cone crusher 3 in order to produce a product resembling fine gravel. The fine portions of this product are removed by screen 4 and the oversize or larger particles are then passed through crushing rolls 5 for further reduction in size. The roll product is subject to a sizing operation in screen 6 where the fine fractions are removed, as before, and the oversize directed to roll crusher 7 where a further reduction in particle size is made in order to produce syenite of the desired grain size. Screen 8 is in closed circuit with roll 7 in order to produce a finished product, so far as sizing is concerned. The preferable procedure for gathering together the syenite of correct grain size is to collect the undersize from the various screens 4, 6 and 8 by means of conveyor 20.

No fixed screen size can be arbitrarily laid down as final as the maximum particle size is determined by the crystallization of the syenite being treated. When the syenite is coarsely crystalline, sizing to 8 mesh may be sufficient, but if the ore is finely crystalline a finer grain size is necessary, 20 mesh for example. Since glass manufacturers generally specify a maximum particle size of 20 mesh for the raw materials used in the batch, it is usually desirable to set 20 mesh as the ruling or maximum size of the syenite ore. Screens 4, 6 and 8 are therefore fitted with wire mesh surfaces adapted to produce such a product. Furthermore, the use of a cone crusher and crushing rolls permits the production of a granular, sand-like product with a minimum of fine dust. Syenite ore, I have discovered, is more amenable to subsequent purification treatment when in such a condition. The presence of considerable fine dust lowers the efficiency of the purification process because of the loss and the mechanical hindrance to magnetic separation.

An induction, rotary type magnetic separator is preferably used for the removal of iron bearing minerals from the syenite. The syenite ore is reduced to a granular condition of about minus 20 to plus 80 mesh preparatory to magnetic separation. For best results, the feed to this separator is closely sized by screen 9 to such sizes as, for example, minus 20 plus 30, minus 30 plus 60, and minus 60 mesh, as experiments indicate a decrease in tailing losses due to loss of finer portions of the feed by centrifugal action of the revolving magnetic rotors. However, it is to be understood that an unsized feed can be treated on the induction rotor magnetic separator, but, for the same capacity, the iron content of the concentrates will generally be higher and the recovery lower.

Other types of high intensity magnetic separators, such as the Rowand Wetherill type, can be employed, but the capacity is usually much lower than the induction type and, generally, the iron content of the concentrates is higher than where induction type separators are used.

Should the syenite contain corundum, this mineral is effectively removed with gravity concentrating tables. Syenites have a specific gravity of about 2.6 whereas corundum has a specific gravity of 4.0. The distinctly higher specific gravity of corundum is therefore used to advantage in a gravity separation process. Corundum is especially harmful in glass, as it is extremely refractory and fuses with difficulty, thus causing "seeds" of unfused material.

The concentrates from the induction rotor magnetic separator 10, (or gravity concentrator 11, when corundum is present) are collected on conveyor 21 and placed in mixing or blending bins 13 whose capacity usually ranges from 80 to 100 tons each. The product before entering these bins is automatically sampled by the mechanical sampler 12 and after the composition has been determined by a chemical or mineralogical analysis, the contents of the various bins 13 are blended by using suitable weighing conveyors, such as the Hardinge belt feeder, or a volume feeder. These feeds empty on conveyor 22 which discharges on conveyor 19 for final loading in railroad car 18. Mixing of the contents of the various bins is not necessary as this is accomplished when the product is being loaded into cars. Furthermore, the contents of the various bins are unloaded at the same time in order to feed the correct mixture on conveyor 22.

When the syenite product is desired for use other than in a granular form in glass, the low iron concentrates, after blending on conveyor 22, are carried into bin 14 which feeds the grinding mill 15, in order to further reduce the particle size to a finely ground condition. This grinding mill is in closed circuit with air classifier 16 whose oversize is returned on conveyor 17 to the grinding mill, and whose finished product passes to railroad cars 18. This finely ground syenite with a low iron content is thus suitable for use in ceramics and also in glass batches when the granular grinding may not be preferred.

The process as described is continuous in operation and the losses depend upon the particular syenite being processed. The losses are generally in proportion to the content of impurities which must be removed and the fine dust lost in processing.

An example of the action of a nepheline syenite to treatment by the above process is as follows:

| Original run-of-mine nepheline syenite | | Concentrates from process |
|---|---|---|
| 59.68 | $SiO_2$ | 62.46 |
| 23.48 | $Al_2O_3$ | 23.23 |
| 1.09 | $Fe_2O_3$ | .07 |
| .26 | CaO | .88 |
| .21 | MgO | .04 |
| 4.68 | $K_2O$ | 4.16 |
| 9.52 | $Na_2O$ | 8.75 |
| .70 | Loss | .43 |

Production per hour: 3½ tons
Recovery: 78.4%

| Screen test of feed to separators | | Percent concentrates |
|---|---|---|
| | Per cent | |
| −16+30 | 48.3 | 70.9 |
| −30+60 | 29.3 | 87.2 |
| −60+100 | 15.6 | 87.3 |
| −100 | 6.8 | 74.0 |

It will thus be seen that the invention accomplishes the foregoing objects. The impurities in the various types of syenites are removed and the concentrates are more desirable and preferable to feldspar used for similar purposes.

It will be understood that variations in the process herein described and claimed, and in the steps thereof, may be made within the purview of the claims, without departing from the scope of the invention, and that such variations will be required by the character of the particular syenite to be treated, its impurities and by other conditions.

The invention claimed is:

1. Process of treating syenites containing iron bearing impurities, which comprises reducing syenite ore to a granular condition of about minus 20 to plus 80 mesh and magnetically separating the iron bearing impurities from said ore while in such granular condition.

2. Process of treating syenites containing iron bearing impurities, which comprises reducing syenite ore to a granular condition of about minus 20 to plus 80 mesh, magnetically separating the iron bearing impurities from said ore while in such granular condition, and grinding the non-magnetic concentrate to a fine powder.

3. Process of treating syenites containing iron bearing impurities, which comprises reducing syenite ore to a granular condition of about minus 20 to plus 80 mesh, removing the fine dust produced by granulation, subjecting the granular syenite to magnetic separation of said impurities, and grinding the non-magnetic concentrate to a fine powder.

4. Process of treating syenites containing iron bearing impurities, which comprises reducing syenite ore to a granular condition, of about minus 20 to plus 80 mesh, removing the fine dust produced by granulation, subjecting the granular syenite to magnetic separation of said impurities, placing the non-magnetic concentrates in separate bins, determining the composition of a representative sample of the contents of each bin, blending the contents of said bins to produce a syenite having a predetermined composition and grinding the blend to a fine powder suitable for use in the ceramic art.

JOSEPH H. WEIS.